United States Patent [19]

Muller et al.

[11] Patent Number: 4,733,147
[45] Date of Patent: Mar. 22, 1988

[54] CONTROL DEVICE OF A DIRECT-CURRENT ELECTRIC MOTOR FOR A WINDSHIELD WIPER

[75] Inventors: Guy Muller, Sevres; Herve Nomerange, Pontault-Combault; Jean-Claude Dekin, Fresnes, all of France

[73] Assignee: Equipements Automobiles Marchal, France

[21] Appl. No.: 875,290

[22] Filed: Jun. 17, 1986

[30] Foreign Application Priority Data

Jun. 18, 1985 [FR] France .............................. 85 09212

[51] Int. Cl.$^4$ .............................................. B60S 1/08
[52] U.S. Cl. .............................. 318/443; 318/DIG. 2; 15/250.17
[58] Field of Search ......... 318/443, 444, 483, DIG. 2; 15/250 C, 250.16, 250.17; 307/10 R

[56] References Cited

U.S. PATENT DOCUMENTS

| 3,684,938 | 8/1972 | Ori ........................................ 318/443 |
| 4,271,381 | 6/1981 | Munz et al. .............. 318/DIG. 2 X |

FOREIGN PATENT DOCUMENTS

| 3022442 | 12/1981 | Fed. Rep. of Germany ...... 318/443 |
| 55-102751 | 8/1980 | Japan ..................... 318/443 |
| 58-39549 | 3/1983 | Japan ..................... 318/443 |
| 59-159682 | 9/1984 | Japan ................. 318/DIG. 2 |
| 0309919 | 4/1969 | Sweden .................. 318/DIG. 2 |
| 2052099 | 1/1981 | United Kingdom ............. 15/250.17 |

Primary Examiner—Bentsu Ro
Attorney, Agent, or Firm—Larson and Taylor

[57] ABSTRACT

The control device comprises a manually operable switch and a system for controlling the stopping of the motor in a fixed position corresponding to a parking position of a windshield wiper. The system comprises an electrical circuit with at least one sliding contact intended to interact with at least one track having electrically conductive and isolating sectors, a relative rotary movement between the sliding contact and the track being controlled by the motor. One of the elements formed by the sliding contact and the track is intended to be connected to the supply terminal of the motor armature, while the other such element can be grounded during the rotary movement. Said one element is connected to the supply terminal of the motor by means of electrical breaker designed to remain open when the wiper motor is operating normally and close when the manual switch is actuated to control the stopping of the motor.

12 Claims, 2 Drawing Figures

4,733,147

CONTROL DEVICE OF A DIRECT-CURRENT ELECTRIC MOTOR FOR A WINDSHIELD WIPER

FIELD OF THE INVENTION

The invention relates to a control device of a direct-current electric motor which is intended for a windshield wiper and of which a first armature brush is grounded and a second armature brush is intended to be connected to a positive battery supply terminal.

In the rest of the text, "terminal" will be used to designate the armature brushes of the motor.

PRIOR ART

The control device which is the subject of the invention is of the type comprising a manual switch and a system controlling the stopping of the motor in a fixed position corresponding to a parking position of a windshield wiper, this system comprising an electrical circuit with at least one sliding contact intended to interact with at least one track having electrically conductive and insulating sectors, a relative rotational movement controlled by the motor taking place between the sliding contact and the track, one of the sliding contact and the track being intended to be connected to the supply terminal of the motor armature whilst the other of the sliding contact and track can be grounded during the relative rotational movement, the assembly as a whole being such that the interaction of the track or tracks and sliding contact or sliding contacts ensures that the supply to the motor is maintained up to the desired fixed stopping position and that, when this position is reached, the supply to the motor is cut off and the motor armature is short-circuited.

The control devices of this type are satisfactory, particularly as regards their service life and the accuracy with which the fixed stopping position is obtained.

It has been discovered, however, that such devices were possibly the cause of interference in radio transmitters or receivers. It also has been discovered that, with devices of this type, if the winshield wiper is moved inadvertently when the manual switch is in the stop position the wiper motor can be actuated, without the user intending it.

OBJECT OF THE INVENTION

The object of the invention is to make the control devices of a direct-current electric motor for a windshield wiper, of the type defined above, so that they satisfy the various practical requirements better than hitherto and, in particular, so that they no longer have the above-mentioned disadvantages or that they have them to a lesser extent.

SUMMARY OF THE INVENTION

According to the invention, there is provided in a control device of a direct-current electric motor intended for a windshield wiper and having:
(a) a first terminal of the armature connected to ground;
(b) a second terminal of the armature intended to be connected to a supply terminal;
(c) a manually controlled switch; and
(d) parking switch means for controlling the stopping of the motor in a fixed position corresponding to a parking position of a windshield wiper driven by the motor, said parking switch means comprising an electrical circuit with contact means designed to interact with track means having electrically conductive and insulating sectors, means ensuring relative rotary movement controlled by the motor and taking place between the contact means and the track means, one of the contact means and the track means being intended to be connected to the supply terminal of the motor armature, whilst the other of said contact means and said track means can be ground during the relative rotary movement, the said device being operative such that the interaction of the track means and the contact means ensures that the supply to the motor is maintained up to the desired fixed stopping position and that, when this position is reached, the supply to the motor is cut off and the motor armature is short-circuited, the improvement wherein said one of said contact means and said track means is connected to the supply terminal of the motor by means of electrical breaker means designed to remain open when the wiper motor is operating normally and to close when the manually controlled switch is actuated to stop the motor.

In general, the supply terminal of the motor is a positive terminal. The track is preferably rotary.

The contact means can comprise, in a known way, three sliding contacts, of which a first is grounded, a second forms the element connected to the supply terminal of the motor and the third is connected to a terminal which, when the manual control switch is set in the stop position, is connected to the second terminal of the motor armature, this armature being short-circuited between the first and third sliding contacts in the fixed stopping position.

According to a first possibility, the electrical breaker means can comprise a relay whose winding is connected to the terminals of the motor when the manual switch is actuated to control the stopping of the motor, whilst the connection of the said one element (sliding contact or track) to the supply terminal of the motor is made by means of a make-contact of this relay and, when the manual switch is actuated to operate the stopping of the motor, the relay is energized and the make-contact closed in response to the voltage supplied by the electric motor which then acts as a generator.

When the device comprises three sliding contacts, the relay winding is connected between the first sliding contact and the third sliding contact, whilst the second sliding contact is connected to the supply terminal of the motor by means of said make-contact.

According to another possibility, the electrical breaker means comprise a semiconductor element (in particular, a thyristor or a transistor), of which the transition to the conductive state is controlled by the voltage which appears at the terminals of the motor which functions as a generator at the moment when stopping is operated.

If the electrical breaker consists of a thyristor or the like then, when the switch is set in the stop position, the gate of this thyristor is connected to the motor terminal by means of a resistor of suitable value.

Where a system with three sliding contacts is concerned, the gate of the thyristor is connected to the third sliding contact which is itself connected to the terminal of the motor. According to another possibility, the manual control switch could be designed to make an electrical connection between the said one element (sliding contact or track) and the positive supply terminal of the motor only in the position of the manual switch corresponding to the stopping of the motor, whilst in the other positions of this switch the electrical connection between the said one element and the supply terminal is broken.

A diode can be connected to the terminals of the relay to prevent a reverse current.

The electrical breaker means provided between the said element and the supply terminal can be located on or in the housing of the motor.

BRIEF DESCRIPTION OF THE DRAWINGS

Apart from the features described above, the invention also includes other objects and advantages which will become apparent from the following description of particular embodiments given with reference to the attached drawing, but which are in no way limiting.

DESCRIPTION OF THE PREFERRED EMBODIMENTS

Figure 1:
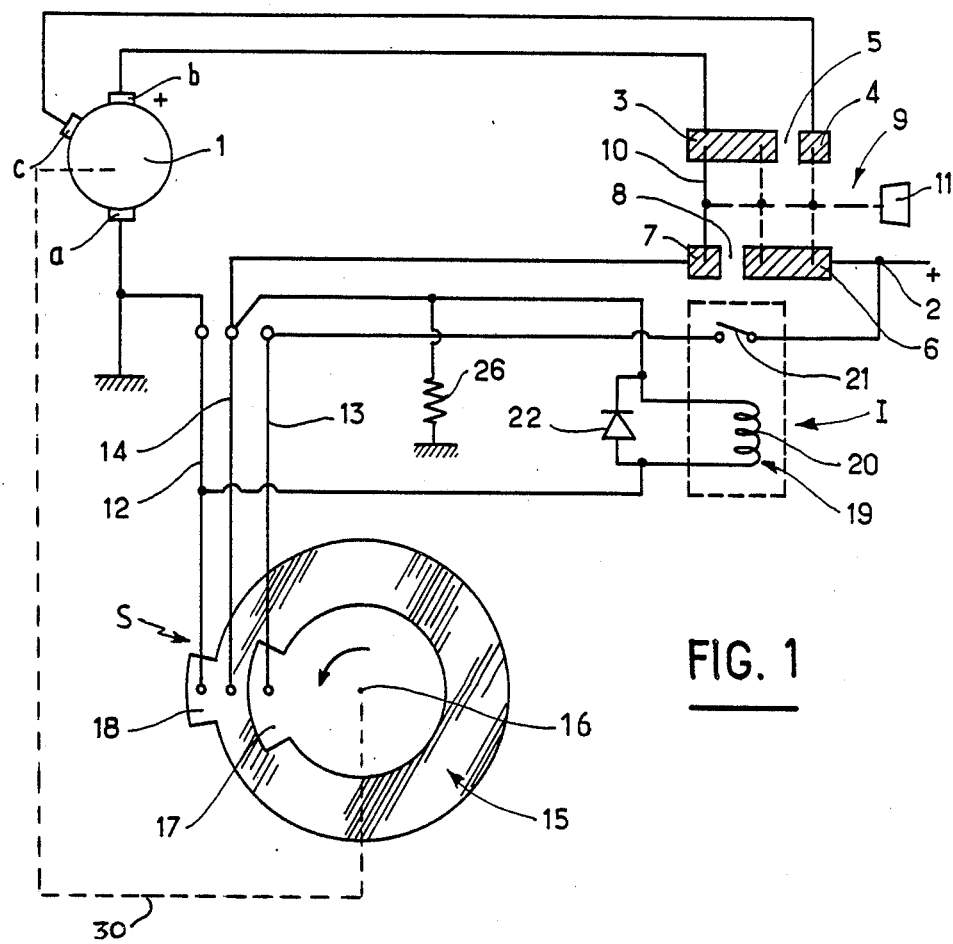
FIG. 1 of this drawing is a diagram of a control device, according to the invention, of a direct-current electric motor for a windshield wiper.

Referring to FIG. 1 of the drawing, this illustrates a control device of a direct-current electric motor 1 for a windshield wiper (not shown). The motor 1 has an armature, of which a first terminal a has been grounded and a second terminal b is intended to be connected to a supply terminal designated by reference numeral 2 and consisting of a positive terminal. In the example under consideration, the motor 1 is intended to make it possible to drive the windshield wiper at two different speeds. For this purpose, the motor 1 has an armature winding, one end of which is grounded, whilst the other end terminates at the above-described terminal b offset angularly relative to a third terminal c. These two terminals b and c are both intended to be connected alternatively to the supply terminal 2. When positive supply voltage is applied to the terminal b, the wiper motor 1 and consequently the windshield wiper operate at low speed; when the terminal c is connected to the terminal 2, the motor 1 and therefore the windshield wiper operate at high speed.

As indicated diagrammatically in FIG. 1, the terminal b is connected by means of an electrical conductor to a manual switch 9 shown diagrammatically, which has a contact board 3 of elongate rectangular shape. The other terminal c is connected by means of an electrical conductor to another contact 4 of substantially square shape, which is arranged in the extension of the contact 3, but which is separated from the latter by an insulating strip 5.

The terminal 2 is connected by means of an electrical conductor to a contact 6 arranged parallel to the contacts 3 and 4, but spaced apart from these in a direction at right angles to the length of the contact 3. A contact 7 of the same shape as the contact 4 is arranged in the extension of the contact 6, from which it is separated by an insulating strip 8. The width of the set of contacts 3 and 4 and of the set 6 and 7 extend in a direction at right angles to the length of the contacts 3 and 6. The dimensions of the insulating strip 8 in the direction parallel to the length of the strips is equal to that of the insulating strip 5.

The manual switch 9 has a busbar 10 which extends transversely to the length of the contacts 3 and 6 and the dimension of which in said transverse direction is substantially equal to the perpendicular distance between the contacts 3 and 6. Thus, the busbar 10 can make an electrical connection between one of the contacts of the set 3, 4 and another contact of the set 6, 7, depending on the position of this busbar 10. The movement of the busbar 10 is controlled from a handle 11 indicated diagrammatically, which is connected mechanically to the busbar 10, from which it is insulated electrically.

In a first position of the handle 11 corresponding to the position of the busbar 10 represented by an unbroken line in FIG. 1, an electrical connection is made by the busbar 10 between the contact 3 and the contact 7 which is insulated from the supply terminal 2.

In a second position of the busbar 10 represented by a broken line and corresponding to a slight movement to the right in FIG. 1, busbar 10 makes an electrical connection between the contact 3 and the contact 6; under these conditions, the terminal b is connected to the supply terminal 2.

Finally, in a third position of the busbar 10, again represented by a broken line and located even further to the right in FIG. 1, an electrical connection is made between the contact 4 and the contact 6; the terminal c is then connected to the supply terminal 2.

The control device incorporates a parking switch S controlling the stopping of the motor 1 in a fixed position corresponding to a parking position of a windshield wiper.

This switch S comprises an electrical circuit with three sliding contacts 12, 13, 14 designed to interact with rotary concentric circular tracks arranged on a connector 15 which consists of a ring of conductive metal of general circular shape driven in rotation about its centre 16 from the motor 1 by means of a connecting mechanism represented diagrammatically by a dotted line 30 in FIG. 1. During the rotation of the motor, the three sliding contacts 12, 13, 14 travel along three concentric circular tracks on the connector 15. The innermost circular track has as insulating sector 17 formed by a cut-out made in the inner edge of the ring-shaped connector 15. The outermost track has, as a conductive element, the only sector 18 projecting radially outwardly relative to the outer contour of the ring 15. The sectors 17 and 18 have the same bisecting radius, but the angular aperture of the sector 17 is greater than that of the sector 18. The first sliding contact 12 bears on the outer track formed by the conductive sector 18 of small angular extent and by an insulating sector extending over the rest of the circumference; the second sliding contact 13 bears on the inner track consisting of the insulating sector 17 and of a conductive sector extending over the rest of the circumference; the third sliding contact 14 bears on the central track which is conductive over its entire circumference.

The first sliding contact 12 is electrically grounded.

The second sliding contact 13 is connected to the supply terminal 2 (positive terminal) by electrical breaker means I which are designed to remain open when the wiper motor 1 is operating normally (low speed or high speed) and which close when the manual switch 9 controls the stopping of the motor 1, that is to say when the busbar 10 is placed in the position represented by an unbroken line in FIG. 1.

According to the solution shown in FIG. 1, the electrical breaker means I comprise a relay 19, the winding 20 of which is connected to the terminals of the motor 1 between the first sliding contact 12 (or ground) and the third sliding contact 14. The second sliding contact 13 is connected to the terminal 2 (positive terminal) by means of a make-contact 21 of the relay 19. This make-contact 21 is closed when the relay 19 is energized, that is to say when the winding 20 is live; this contact 21 is opened when the relay 19 is de-energized.

The third sliding contact 14 is also connected electrically to the contact 7.

A diode 22 can be connected to the terminals of the relay to prevent a reverse current; the anode of this diode 22 is grounded, whilst the cathode is connected to the relay terminal which is connected to the sliding contact 14.

Under these circumstances, the mode of operation of the device is as follows.

The device in the stopped position, as shown in FIG. 1, may be taken as a starting-point.

Acting on the switch 9 makes it move into an operating position corresponding, for example, to low speed. Under these conditions, the busbar 10 is moved to the right into the second position represented by a broken line and makes an electrical connection between the contact 6 and the contact 3. The terminal b of the motor 1 is connected to the positive supply, and the motor 1 starts to rotate at low speed, driving the windshield wiper and the ring 15.

The relay 19 is not energized, since its terminal connected to the sliding contact 14 is isolated from the positive supply terminal 2 and from the terminal b. The make-contact 21 remains open, and the sliding contact 13 does not receive supply voltage.

Under these conditions when, during the rotation of the ring 15, the sliding contacts 13 and 14 are connected electrically by means of the ring 15 (which occurs in the angular positions of the ring 15 in which the end of the sliding contact 13 co-operating with this ring is outside the isolating sector 17), the sliding contact 14 does not experience the voltage of the positive terminal and remains substantially at ground potential.

When the sliding contact 14 and the sliding contact 12 are connected electrically to one another, which occurs when the end of the sliding contact 12 is in contact with the sector 18 as shown in FIG. 1, the sliding contact 14 remains at ground potential.

Thus, during normal operation, the sliding contact 14 is not subjected to potential variations between the positive potential of the supply terminal 2 and ground. Consequently neither the sliding contact 14 nor the ring 15 are subject to voltage transitions which would disturb the entire environment by electromagnetic radiation. It should be noted that the connecting conductors and the track system formed by the ring 15 have a stray capacity which would be charged and discharged alternately if such a voltage transition were to occur, and this would cause a substantial current to pass during the charging and discharging of this stray capacity. The electromagnetic environment would be disturbed by the interference resulting from such phenomena.

Such a voltage transition at the sliding contact 14 and the ring 15 would occur if the sliding contact 13 were connected directly to the terminal 2, without the agency of the breaker means I according to the invention, which allow effective interference suppression of the control device.

To stop the motor 1, the switch 9 is actuated to bring the busbar 10 into the position represented by an unbroken line in FIG. 1, to make an electrical connection between the contact 3 and the contact 7. The winding 20 of the relay 19 is connected to the terminals b and a (low speed) of the armature of the motor 1.

It should be noted that, at the moment when this connection is made, the ring 15 which is rotating occupies any position, in particular a position in which the sliding contacts 12 and 14 are not connected by means of the sector 18.

As a result of its inertia, the motor 1, which is no longer supplied with current, continues to rotate and functions as a generator, in such a way that a positive voltage is maintained at the terminal b. This voltage is applied to the terminals of the winding 20 of the relay which is energized. The make-contact 21 closes, so that the sliding contact 13 is connected to the supply terminal 2. The connection made in this way between the sliding contact 13 and the terminal 2 allows the terminal b of the motor 1 to be supplied once again from the terminal 2, when the ring 15 occupies an angular position which is such that the sliding contacts 13 and 14 are connected electrically by means of the ring. This is the situation when the motor 1 does not occupy the angular position (shown in FIG. 1) corresponding to the fixed stopping position.

The motor 1 therefore continues to be energized, until the end of the sliding contact 13 arrives at the insulating sector 17 corresponding to the fixed stopping position. At the same time, the sliding contact 12 is connected electrically to the sector 18, and the armature of the motor 1 is short-circuited as a result of the electrical connection made between the sliding contacts 12 and 14. The motor 1 stops practically instantaneously in this fixed stopping position.

The relay 19 is no longer energized and the make-contact 21 opens.

The control device according to the invention has the following additional advantage, quite apart from that of interference suppression. If the windshield wipers are driven from the electric motor by means of a reduction gear, the latter may have a certain reversibility, particularly when it has high efficiency. Because of this reversibility, even if the motor 1 is stopped and the switch 9 is in the off position, it is possible to move the windshield wipers manually and thus rotate the shaft of the motor 1 and the conductive ring 15. Such a movement can be produced inadvertently.

In the absence of any breaker means I, if the shaft of the motor 1 and consequently the ring 15 were to be moved a few degrees, a sufficient amount to bring the sliding contact 13 in contact with the conductive ring 15, the terminal b of the motor 1 would become connected to the supply terminal 2 by means of the sliding contact 14, the sliding contact 13 and the direct connection between this sliding contact 13 and the terminal 2. The motor 1 would then execute a complete revolution until it returned to its fixed stopping position: this phenomenon could continue until the cause of the windshield wiper moving away from its parking position is eliminated.

Such a disadvantage is overcome with the breaker means I of the invention, since in the fixed stopping position of the motor (shown in FIG. 1) the contact 21 of the relay 19 opens. If, from this fixed stopping position, the ring 15 is rotated a few degrees and electrically connects the sliding contact 14 and sliding contact 13 to one another, the fact that the contact 13 is isolated from the supply 2 (because of the opening of the contact 21) ensures de-energisation of the motor 1.

This motor 1 can only be started by actuating the switch 9.

Figure 2:
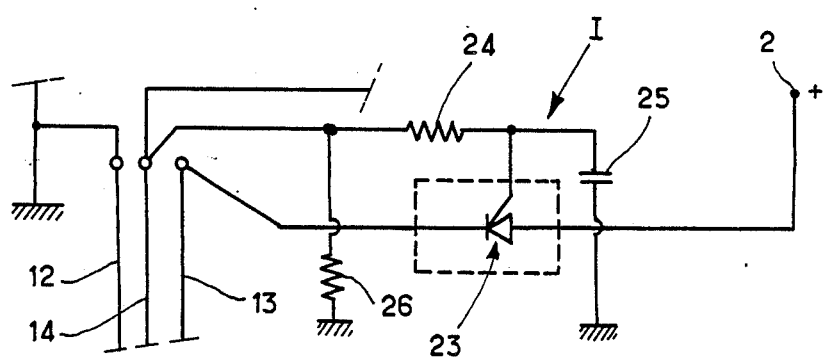
FIG. 2 is a diagram of an alternative embodiment.

FIG. 2 represents an alternative embodiment, in which the electrical breaker means I comprise a thyristor 23 in place of the relay. The anode of the thyristor 23 is connected to the supply terminal 2. The cathode of the thyristor is connected to the sliding contact 13. The gate of the thyristor 23 is connected to the sliding contact 14 by means of a resistor 24 of suitable value. A capacitor 25 can be connected between the gate and ground.

Both in FIG. 1 and in FIG. 2 a resistor 26 can be connected between the sliding contact 14 and ground to prevent any potential variation during the operation of the ring 15, since these potential variations can cause interference.

The mode of operation of the device shown in FIG. 2 is similar to that described with regard to FIG. 1. During the normal operation of the motor 1, the thyristor 23 is blocked. When the switch 9 is set to the off position, the busbar 10 occupies the position represented by the unbroken line in FIG. 1; the motor 1 then functions as a generator, and the voltage at the terminal b applied both to the sliding contact 14 and to the gate of the thyristor 23 by means of the resistor 24 causes this thyristor to become conductive. The motor 1 is once again supplied from the terminal 2.

When the motor reaches the fixed stopping position, the sliding contact 13 rides on the insulating sector 17 and the current passing through the thyristor 23 is interrupted. The thyristor is once more extinguished.

In another possibility, the electrical breaker means I could consist of a switch 9 designed so that the supply voltage of the terminal 2 is only applied to the sliding contact 14 when the switch 9 occupies the position in which the busbar 10 connects the contacts 3 and 7 (the position of the busbar 10 represented by an unbroken line in FIG. 1).

The exemplary embodiment described in detail comprises a system with three fixed contacts co-operating with rotating tracks. It is clear, however, that the invention can be applied to systems which can have a different number of contacts and/or tracks, and to systems in which the contacts are driven in rotation whilst the tracks would be fixed, for example, as described in FR-A-2,428,344.

We claim:

1. In a control device of a direct-current electric motor having an armature for driving a windshield wiper, comprising:
   a manually controlled switch for controlling the operation of said windshield wiper;
   a first terminal of the armature connected to ground;
   a second terminal of the armature connected to a power supply terminal through said manually controlled switch;
   a parking switch means for controlling the stopping of said motor in a fixed position corresponding to a parking position of said windshield wiper, wherein said parking switch means comprises an electric circuit having a plurality of contact means, said plurality of contact means being designed to interact with a track means, said track means having electrically conductive and insulating sectors; and means for ensuring relative rotary movement, controlled by said motor and taking place between said plurality of contact means and said track means;
the control device being characterized in that the interaction of said plurality of contact means and said track means ensures that the power supply to the motor is maintained up to a desired fixed stopping position and that, when this stopping position is reached, the power supply to the motor is cut off and the motor armature is short-circuited, and wherein said plurality of contact means comprises a first contact connected to said manually controlled switch, a second contact connected to ground, and a third contact connected to said power supply terminal via an electrical breaker means, said electrical breaker means being designed to remain open when said motor is operated continuously and close when said manually controlled switch is actuated to stop said motor.

2. A control device as claimed in claim 1, wherein said electrical breaker means comprises a relay having a winding; and wherein said manually controlled switch is effective to (a) connect said relay winding to said armature terminals when said manually controlled switch is actuated to stop said motor, said third contact and said track means being connected to the power supply terminal via a make-contact of said relay; and (b) energize the voltage supplied by said motor which acts as a generator when said manually controlled switch is actuated to control the stopping of said motor.

3. A control device according to claim 2, further including a resistor connected between said first contact and the ground; means connecting the winding of the relay between said first contact and said second contact; and said make-contact connecting said third contact to said power supply terminal.

4. A control device according to claim 1, wherein said electrical breaker means comprises a semiconductor element whose transition to the conductive state is controlled by the voltage which appears at the terminals of the armature of said motor which operates as a generator at the moment when stopping of said motor is controlled.

5. A control device according to claim 4, wherein said semiconductor element is a thyristor having a gate connected to one of said armature terminals through a resistor when said manually controlled switch is in an off position.

6. A control device according to claim 5, further including a capacitor connected between the gate of said thyristor and the ground.

7. A control device according to claim 4, wherein said semiconductor element is a thyristor having a gate connected to the second terminal of the armature through a resistor when said manually controlled switch is in an off position; and wherein the gate of said thyristor is connected to said first contact which is itself connected to said second terminal of the armature when said manually controlled switch is actuated to control the stopping of said motor.

8. A control device according to claim 5, further including a capacitor connected between the gate of said thyristor and the ground; and wherein said gate is connected to said first contact which is itself connected to said second terminal of the armature when said manually controlled switch is actuated to control the stopping of said motor.

9. A control device according to claim 1, wherein said first contact is also connected to said second terminal of the armature when said manually controlled switch is in an off position; said control device further including means for short-circuiting said motor armature between said first contact and said second contact.

10. A control device according to claim 9, further including a resistor connected between said first contact and the ground.

11. A control device according to claim 1, wherein said manually controlled switch is effective to make an electrical connection between said power supply terminal and one of said plurality of contact means through said track means only when said manually controlled switch is in a position corresponding to the stopping of said motor; and to break said electrical connection when said manually controlled switch is in all other positions.

12. A control device according to claim 1, wherein said electrical breaker means is positioned on the housing of said motor.

* * * * *